United States Patent [19]

Petersen

[11] Patent Number: 5,675,766

[45] Date of Patent: Oct. 7, 1997

[54] NETWORK INTERFACE CARD FOR READING DYNAMICALLY CHANGING DATA

[75] Inventor: Brian Petersen, Los Altos, Calif.

[73] Assignee: 3COM Corporation, Santa Clara, Calif.

[21] Appl. No.: 449,827

[22] Filed: May 24, 1995

Related U.S. Application Data

[62] Division of Ser. No. 383,663, Feb. 2, 1995, which is a continuation of Ser. No. 18,694, Feb. 17, 1993, abandoned.

[51] Int. Cl.$^6$ .................. G06F 13/00; G06F 13/36; G06F 13/42
[52] U.S. Cl. .................. 395/481; 364/DIG. 1; 395/486; 395/494
[58] Field of Search .................. 364/DIG. 1, DIG. 2, 364/243, 246, 239, 251; 395/250, 405, 412, 484, 481, 486, 494, 476, 478

[56] References Cited

U.S. PATENT DOCUMENTS

| | | | |
|---|---|---|---|
| 4,388,687 | 6/1983 | Tuibell et al. | 395/412 |
| 4,599,708 | 7/1986 | Schuster | 365/174 |
| 4,630,196 | 12/1986 | Bednar, Jr. et al. | 395/200.14 |
| 4,648,065 | 3/1987 | Zenk et al. | 395/478 |
| 4,692,859 | 9/1987 | Ott | 340/825.65 |
| 4,814,971 | 3/1989 | Thatte | 395/182.13 |
| 4,835,672 | 5/1989 | Zenk et al. | 395/478 |
| 4,888,773 | 12/1989 | Arlington et al. | 371/40.2 |
| 5,003,463 | 3/1991 | Coyle et al. | 395/877 |
| 5,043,935 | 8/1991 | Taniai et al. | 395/886 |
| 5,134,699 | 7/1992 | Aria et al. | 395/855 |
| 5,247,644 | 9/1993 | Johnson et al. | 395/484 |
| 5,263,139 | 11/1993 | Testa et al. | 395/307 |
| 5,291,582 | 3/1994 | Drako et al. | 395/846 |
| 5,371,870 | 12/1994 | Goodwin et al. | 395/872 |
| 5,392,406 | 2/1995 | Petersen et al. | 395/325 |
| 5,473,761 | 12/1995 | Parks et al. | 395/404 |

*Primary Examiner*—Tod R. Swann
*Assistant Examiner*—Tuan V. Thai
*Attorney, Agent, or Firm*—Wilson, Sonsini, Goodrich & Rosati

[57] ABSTRACT

A mechanism is provided that allows partial reading of storage locations, such as statistics counters, by providing a temporary read data storage latch on a peripheral device. The latches are updated with fresh data from an address storage location whenever any one of the following conditions is met:

1. The address accessed by the host differs from the previous access;

2. The host has written to the device prior to the current read; or

3. When accessing the same location sequentially, one or more bytes of the second read have already been read by the host in a previous read.

These rules allowed for byte- or word-wise write/read/verify cycles; byte- or word-wise reads of dynamic data; and byte, word, or double-word with polling of registers. With this mechanism, it is impossible for the host to erroneously end up with 01ff (hex) as it reads a four byte register a byte at a time when the register increments from 00ff to 0100 between the sequential reads.

3 Claims, 5 Drawing Sheets

NETWORK INTERFACE CARD FOR READING DYNAMICALLY CHANGING DATA

CROSS-REFERENCE TO RELATED APPLICATIONS

This application is a divisional of application No. 08/383,663, filed Feb. 2, 1995, which is a continuation of application No. 08/018,694, filed Feb. 17, 1993, now abandoned.

The present application is related to co-pending U.S. patent application entitled NETWORK INTERFACE WITH HOST INDEPENDENT BUFFER MANAGEMENT, Ser. No. 07/921,519, filed Jul. 28, 1992, which was owned at the time of invention and is currently owned by the same assignee.

BACKGROUND OF THE INVENTION

1. Field of the Invention

The present invention relates to apparatus allowing partial reads of storage locations containing data that may change between sequential reads. For instance, for a storage location storing a double word, the system of the present invention allows byte, word, or double word accessing of the storage location.

2. Description of Related Art

Typical data processing systems include a host processor and one or more peripheral devices. Often, the peripheral devices maintain information for use by the host in a memory which is updated independent of the host. The storage locations containing the information may include a plurality of bytes per host address. The host may have a need to read one or more bytes from the storage location without reading all of the bytes at a single time. Also, the host may be limited to reading a subset of the plurality of bytes at a time by access paths involved.

When the storage location contains dynamically changing data, such as counters, and the like, there is the potential that a partial read of one section of the storage location followed by a partial read of the other section would yield useless results because of changes to the information that occur between the reads. For instance, the host could erroneously read 01ff (hex) as it reads a four byte register a byte at a time, while the actual contents of the register increment from 00ff to 0100. Thus, it is desirable to provide a mechanism that allows section wide reads of a multi-section register containing dynamic data.

SUMMARY OF THE INVENTION

The present invention provides an apparatus for storing changing data, which comprises a storage location having a plurality of sections, such as bytes, for storing changing data. A read store is coupled to the storage location and responsive to an update signal, for storing data from the plurality of sections of the storage location. Upon reading the storage location, section enable signals indicate selected ones of the plurality of sections in the storage location subject of the read. The selected sections of the data in the read store are presented for access by the host together with the section enable signals. The update signal is generated in response to the section enable signals so that the read store is not changed between sequential reads to different sections of the storage location.

The logic for generating the update signal includes an address comparator for detecting a sequence of at least two sequential reads to the storage location. Also, logic is included which is responsive to a detection of a sequential read and the section enable signals for controlling the update signal so that the read store is not updated during the sequential reads to different sections of the storage location and is updated when a current read in the sequence selects a section already read in a previous read in the sequence.

The system is applicable to systems including a single storage location or those including a memory having a plurality of addressable storage locations, all of which are coupled to the read store.

In another aspect of the present invention, a peripheral device is provided, which includes a memory, including the plurality of the storage locations. The peripheral device supplies data to the plurality of storage locations independent of the host data processing system. The host interface includes a read store coupled to the memory, addressing means for supplying addresses and section enable signals for reads, a data path for presenting data in the read store to the host data processing system with the section enable signals, and control logic for generating the update signal for the read store, in response to the addresses and the section enable signals so that the read store is not changed between sequential reads by the host data processing system to different sections of the same storage location.

In yet another aspect of the present invention, the peripheral device includes a network interface processor generating information concerning interface processes independent of the host data processing system.

Accordingly, a mechanism is provided that allows partial reading of storage locations, such as statistics counters, by providing a temporary read data storage latch on the peripheral device. The latches are updated with fresh data from an addressed storage location whenever any one of the following conditions is met:

1. The address accessed by the host differs from the previous access;
2. The host has written to the device prior to the current read; or
3. When accessing the same location sequentially, one or more bytes of the second read have already been read by the host in a previous read.

These rules allow for byte- or word-wise write/read/verify cycles; byte- or word-wise reads of dynamic data; and byte, word, or double-word width polling of registers. With this mechanism, it is impossible for the host to erroneously end up with 01ff (hex) as it reads a register a byte at a time when the register increments from 00ff to 0100 (for example) between the sequential reads.

This mechanism is particularly useful in the context of a peripheral device, such as a network interface adapter, which contains statistic registers, counters, and the like, which are read from time to time by the host processor.

Other aspects and advantages of the present invention can be seen upon review of the figures, the detailed description, and the claims which follow.

DESCRIPTION OF THE PREFERRED EMBODIMENTS

A detailed description of a preferred embodiment of the present invention is provided with respect to the figures.

Figure 1:
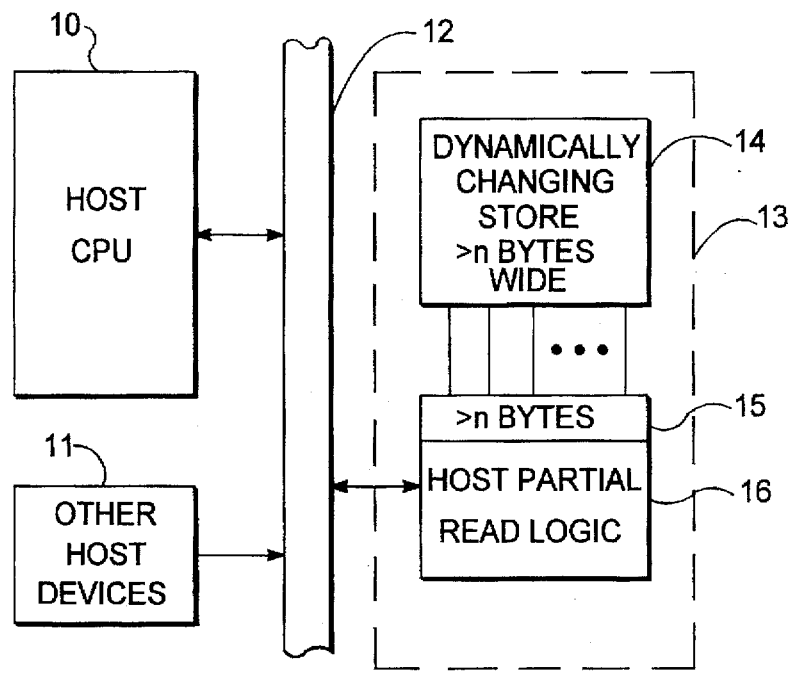
FIG. 1 provides a basic block diagram of a system according to the present invention for allowing partial reads of dynamically changing data.

FIG. 1 provides a generic diagram of a system implementing the present invention. The system includes a host central processing unit 10, and other host devices 11 coupled to a host system bus 12. Also coupled to the host system bus is a peripheral device, generally 13, which includes a dynamically changing store 14, a host read register 15, and host partial read logic 16. The dynamically changing store 14 is a plurality of bytes wide (greater than N). For instance, it may be a double word (four byte) memory, including one or more addressable storage locations. The read store 15 is of the same width as the dynamically changing store 14 in the preferred system. The host partial read logic 16 allows the host to read the data in the host read store 15 one byte or a plurality of bytes at a time, while preventing updates of the read store 15 between sequential reads of different bytes of the same storage location.

Although in the example, the dynamically changing store is segmented on byte boundaries, a byte may be more generically referred to as a section of the dynamically changing storage location, including any number of bits.

The peripheral device 13 supplies data to the dynamically changing store independent of the host processing system. Thus, the host may be unaware of changes to a storage location which occur between sequential reads, It should be recognized that the host read of later sections of the storage location may be slightly out of date due to changes that occur between the sequential reads but not reflected in the read store 15. The system utilizing the information read in this manner should be cognizant of the potential for errors of this nature by recognizing that the sequential reads will access the data as it existed at the time of the first read.

As mentioned above, one preferred application of the present invention is in network interface controllers such as described below with reference to FIGS. 2 and 3.

System Overview

Figure 2:
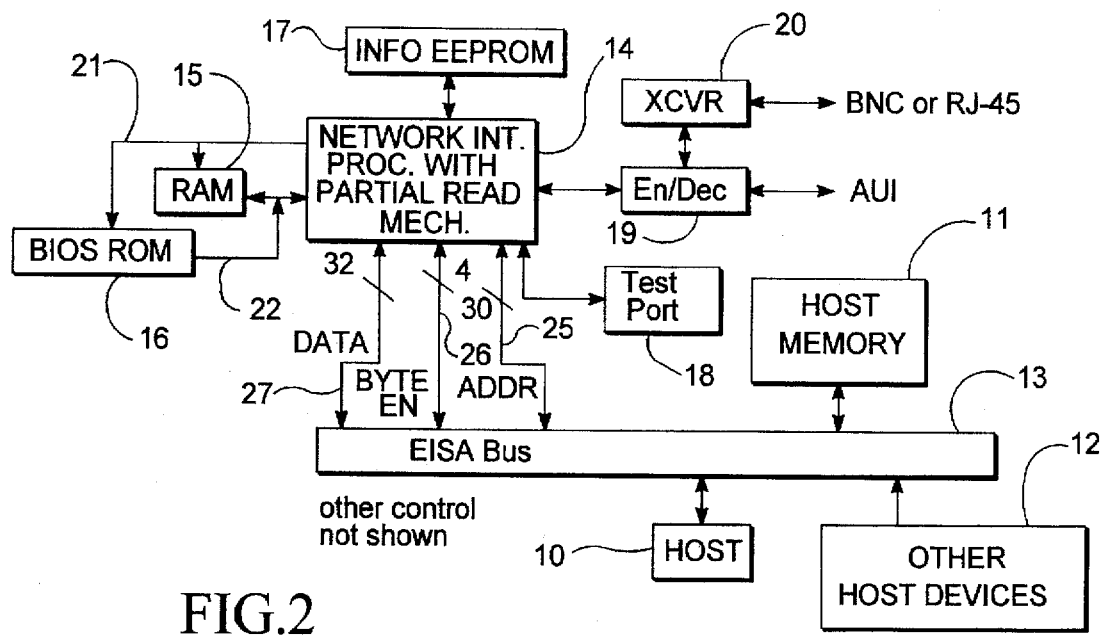
FIG. 2 is a block diagram of a preferred implementation of a host system and network interface device which implements the partial read mechanism of the present invention.

FIG. 2 is a schematic diagram of a computer system including a network interface controller using the partial read mechanism according to the present invention. The computer system includes a host system, including a host processor 10, host memory 9, and other host devices 11, all communicating through a host system bus 12, such as an Enhanced Interface System Architecture EISA bus. The host system bus 12 includes address lines which define a host system address space. An EISA bus supports 32 bit addresses establishing a host system address space of about 4 Gigabytes. The address is communicated from the EISA bus to network interface processor 40 with the higher order 30 bits on lines 25 and four byte enable signals representing the two low order bits on lines 26. Data is communicated across 32-bit line 27 in four byte lanes of eight bits each, and corresponding to the four byte enable signals. The EISA bus also supports 16-bit devices. The network interface processor includes a host read interface allowing partial reads as described in more detail with reference to FIGS. 4 and 5.

The network interface controller includes a network interface processor, 40, implemented in one preferred system as an application specific integrated circuit designed to implement the functions outlined below using a hardware description language such as VERILOG design tools as known in the art (available from Cadence, Inc., San Jose, Calif.). The network interface processor 40 is coupled through appropriate buffers to the bus 12. The network interface processor 40 is also coupled to random access memory 41, Basic Input Output Subroutines Read Only Memory BIOS ROM 42, and Information Electrically Erasable Programmable Read Only Memory INFO EEPROM 17, a test port 18, an encode/decode chip 19, and a network transceiver 20. The network transceiver 20 is, in turn, coupled to a network medium.

A majority of the functionality is embodied in the network interface processor 40. In the preferred embodiment, all registers that are accessible across the bus 12 by the host system reside either in the network interface processor 40, or in the RAM 41. If residence in the Random Access Memory RAM 41, their access is managed by the network interface processor 40.

The RAM 41 is a primary resource on the network interface controller. This resource provides buffer memory outside the host address space used in the transmit and receive operations of the network interface. Details concerning the organization and utilization of this RAM 41 are described below.

The BIOS ROM 42 provides extension to the host system's basic input/output code through the network interface processor 40 during initialization. The addresses for the BIOS ROM 42 and the data from the BIOS ROM 42 are coupled to the network interface processor 40 across buses 21 and 22, respectively, which are also shared by the RAM 41.

The INFO EEPROM 17 stores critical adapter specific data used by drivers, diagnostics, and network management software. This data is stored during the manufacturing process. During initialization of the interface controller, the contents of the Electrically Erasable Programmable Read Only Memory EEPROM 17 are loaded into a prespecified area of the RAM 41 for use during operation. Coupled to the interface processor 40 is an encode/decode chip 19, such as the National Semiconductor 8391 Manchester encode/decode chip. The signals coupled to the Attachment Unit Interface AUI connector are provided to allow use of a transceiver external to the board.

The transceiver 20 in a preferred system comprises either a thin Ethernet Coaxial Connector/Barrel Type N Connector (coax/BNC) transceiver or a 10BaseT Ethernet standard: 10BaseT stands for; 10=10 Mbit/sec. data rate, Base= Baseband, T=twisted pair wire over 100 meters nominal segment length) (Type 3/RJ-45) transceiver. Control signals for the transceiver 20 are produced on the network interface controller 40, using the conversion logic on the encode/decode chip 19.

A test port 18 is provided in a preferred system for use during manufacture and testing.

Figure 3:
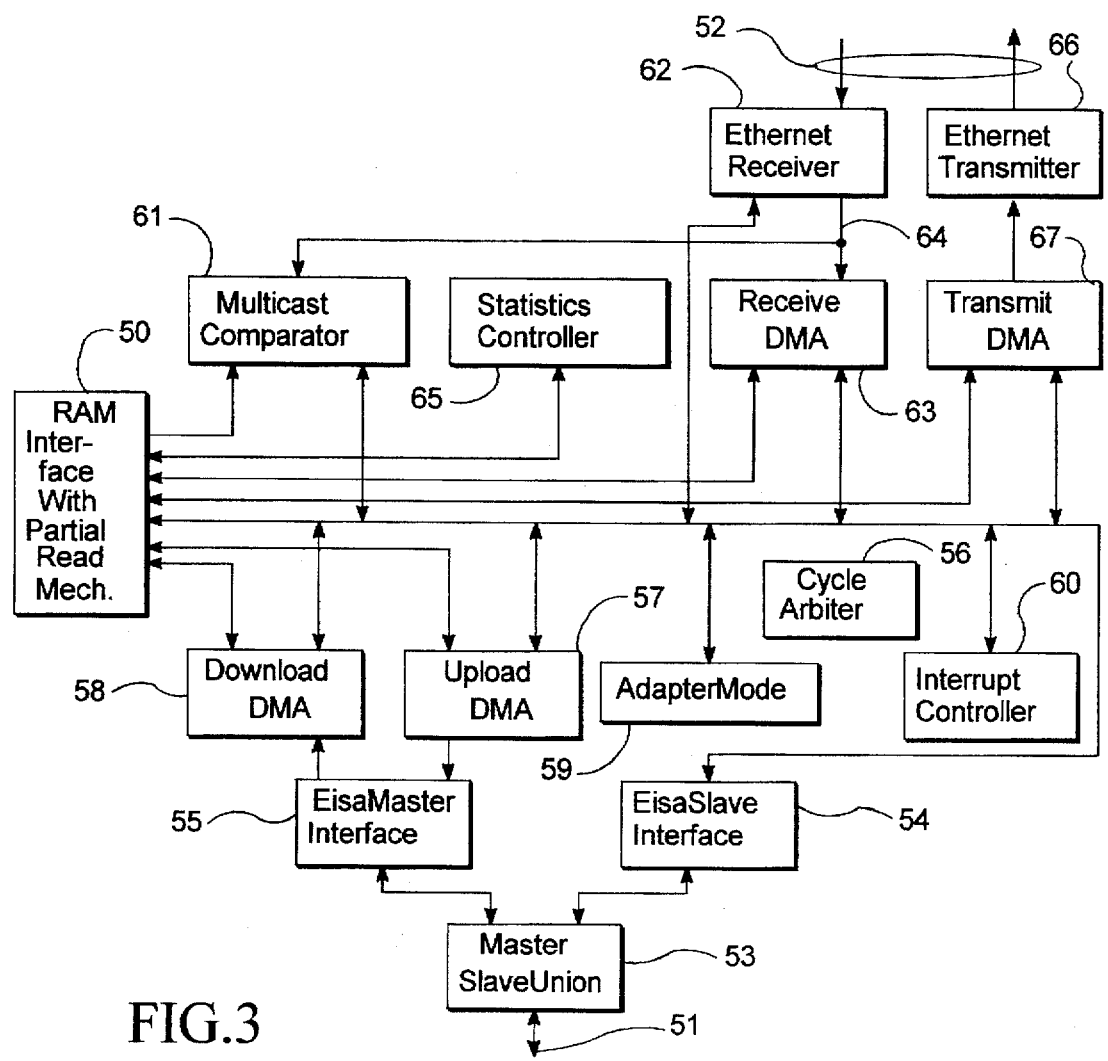
FIG. 3 is a block diagram of the network interface processor of FIG. 2 implementing the partial read mechanism of the present invention.

FIG. 3 provides a block diagram of the network interface processor 40 of FIG. 2, including functional blocks and data paths. There are numerous connections not shown having to do with the control of the various data flow paths. The interfaces illustrated include a RAM interface 50, a host bus interface 51, and a transceiver interface 52. The bus interface 51 is implemented for an EISA bus, and operates at times either as a master or as a slave on the bus. Each of the functional units in the implementation shown in FIG. 3 is described below.

EISA Slave Interface 54

The EISA slave interface 54 provides a path for the EISA host to access the registers and buffers managed by the network interface controller. The module contains configuration registers for the controller, and performs crude decoding of the EISA bus for the purpose of routing signals. The EISA slave interface 54 does not interpret any of the addressing of individual registers distributed throughout the controller.

In operation, the EISA slave interface 54 continuously monitors the EISA address bus and determines when the configuration registers, memory mapped network registers, or BIOS ROM of the adapter are being accessed.

In addition, for every memory slave cycle initiated by the EISA bus, the EISA slave interface will post a cycle request to the cycle arbiter 56. The cycle arbiter 56 imposes wait states upon the host system until the request has been granted.

The EISA slave interface also provides a generic 32 bit bus interface to the remainder of the network controller. The generic nature of the interface allows for easy adaptation of the design to other bus types, such as the microchannel, without requiring redesign of the remainder of the chip.

Bits 14-2 of the EISA address bus are latched and pass through to other modules. The least significant two bits (1,0) of the address are represented by 4 byte enables that are also valid throughout a data transfer cycle. Four 8-bit byte lanes make up the slave data channel. The data bus is actually a pair of unidirectional buses, one for writes and one for reads in a preferred system. The data write bus is wired in a multi-drop fashion to all modules that require connection to the EISA data bus through the slave interface. The read bus is multiplexed and masked in the RAM interface module 50. Write requests by the EISA bus can be held until they are acknowledged by the cycle arbiter 56. When a cycle is held, the EISA bus may be released from wait states while the cycle completes on the adapter. If a second cycle is generated by the EISA bus while the first one is still pending, then the EISA bus will be held off with wait states until the pending write is performed. In this specific embodiment, pipelining of EISA reads is not supported.

The EISA slave interface also provides an interface to the EEPROM 17. This interface operates to transfer the contents of the EEPROM 17 into the adapter memory after reset.

There are numerous registers in the EISA slave interface module 54, primarily related to configuration of the adapter that conform to the EISA bus specification. These registers do such things as set up the adapter's memory base address, the interrupt level, the transceiver type selection, and the BIOS ROM enable. The configuration registers also provide the host with a positive means of identifying the adapter type and to globally disable the adapter.

EISA Master Interface 55

The EISA master interface 55 handles requests from the upload Direct Memory Access DMA 57 and download DMA 58 for performing bus master operations across the EISA bus. The EISA master interface 55 autonomously arbitrates between pending upload and download requests, because of the EISA bus disallowing mixed reads and writes while performing burst transfers, used by the DMA operations of the preferred embodiment.

The bus master transfers are always initiated by either the upload DMA 57 or the download DMA 58. The transfers may be terminated by either the DMA modules upon completion of a transfer, or by the EISA master interface upon preemption by another arbitrary device on the EISA bus.

Thus, the function of the EISA master interface 55 is to arbitrate for access to the EISA bus when transfer requests are pending from either or both of the upload DMA 57 and the download DMA 58. The EISA master interface 55 performs the signalling necessary to establish first transfers with address slaves on the bus. It also ensures compliance with the EISA bus definitions.

This module also converts real mode segment:offset addresses to 20 bit linear addresses when enabled by the adapter mode logic 59.

Master/Slave Union Module 53

The master/slave union module 53 provides for sharing of connections to the EISA bus by the EISA master interface 55 and the EISA slave interface 54. This union module 53 consists primarily of a series of 2:1 multiplexers.

Interrupt Controller Module 60

The controller also includes an interrupt controller module 60. The interrupt controller module 60 implements various interrupt and indication functions, including masking and enable/disable mechanisms. Interrupt signals are generated by various modules within the controller, and are routed to the interrupt controller module 60. The interrupt controller module 60 then passes the interrupt signals through various enables and masks before OR-ing them together and driving the result onto the host bus.

The interrupt controller module 60 does not detect interrupt worthy events or acknowledge the interrupts passed to the host. It includes a number of adapter resident registers utilized in the interrupt handling functions.

Adapter Mode Module 59

The adapter mode module 59 provides a number of functions including setting various basic operating modes of the controller, and reporting status of various conditions of the controller. The adapter module 59 also establishes the base address of a window register used for diagnostics by the host system. Furthermore, the adapter mode module 59 generates reset functions for the adapter. Also, this module provides the Media Access Control Identification MAC ID register which identifies the media access controller implemented by the device, for communication to various modules within the controller and to the host system.

Cycle Arbiter Module 56

The cycle arbiter module 56 is responsible for distributing access to the adapter's RAM resident and Application Specific Integrated Circuit ASIC resident registers through the RAM interface 50 among various requestors. It functions to allow timely access to the RAM by modules that are most in danger of suffering an overrun or underrun condition in response to a priority scheme.

Multicast Comparator Module 61

The controller also includes a multicast comparator module 61. When enabled by the adapter mode module 59, the multicast comparator module 61 performs a bit by bit comparison of a received frame's destination address field with contents of the multicast address table. The multicast address table is established by the host and stored in RAM 41. A mismatch during this compare, coupled with neither an individual address nor a broadcast address match, will result in the rejection of an incoming frame.

Thus, the multicast comparator module 61 monitors the activity of the Ethernet receiver module 62 and the receive DMA module 63 to determine when a new frame is being received. Each byte that is received by the Ethernet receiver 62 and presented at the parallel interface 64 of the receiver, is shadowed by the multicast comparator module 61. These bytes are then compared against valid entries in a multicast address table accessible by the multicast comparator 61.

The multicast comparator 61 does not establish or maintain the contents of the multicast address table. However, the module detects the host accesses to the table and supplies appropriate redirection offsets to the RAM interface module 50.

Statistics Controller Module 65

The preferred system also includes a statistics controller module 65. This module monitors activity of various other modules within the controller, most particularly the Ethernet transmitter module 66 and the Ethernet receiver module 62, and updates statistics maintained in RAM 41 as applicable events occur.

In the preferred system, the processor maintains 20 double word statistics counters. The gathering of statistics is enabled by control signals implemented in the adapter mode module 59. When enabled, the statistics counters advance as the corresponding events occur. No host intervention is required to facilitate this counting. Thus, the information is supplied to the respective registers independent of the host.

After adapter power up and prior to enabling the statistics counters, a driver in the host system clears all the counters to zero by writing zeroes to every statistics register.

Using the present invention, the host can read any or all of the statistics registers at any time, either byte-wise, word-wise, or double word-wise, without having any effect on the collection of statistics or the operation of the adapter.

The statistics registers in the preferred system include registers storing transmit statistics and registers storing receive statistics as follows:

TRANSMIT STATISTICS

FramesXmittedOk: The number frames of all types transmitted without errors. Loss of carrier and absence of an expected sqe are not considered to be errors by this statistic.

BytesXmittedOk: A total of all bytes transmitted without error for all frame types.

MulticastFramesXmittedOk: A count of all multicast frames transmitted without error. Broadcast frames are not considered to be multicast frames.

BroadcastFramesXmittedOk: All broadcast frames transmitted without error are counted here.

FramesDeferred: If the transmission of a frame had to defer to network traffic, the event is recorded in this statistic.

SingleCollFrames: Frames that are transmitted without errors after one and only one collision (including late collisions) are counted by this register.

AtLeastTwoCollisions: All frames transmitted without error after experiencing from 2 through 15 collisions (including late collisions) are counted here.

MaxCollisions: Frames that could not be transmitted due to experiencing 16 collisions (including late collisions) are counted by this register.

LateCollisions: Every occurrence of a late collision (there could be more than one per frame transmitted) is counted by this statistic.

CarrierLost: Frames that were transmitted without error but experienced a loss of carrier are counted by this statistic.

HeartbeatMissing: If the adapter is configured to expect a sqe pulse after each transmission and did not receive such a pulse, the event is counted here.

AllCollisions: Every collision detected on the network—regardless of whether or not this particular adapter was participating in the collision—is counted here.

Underruns: Every occurrence of a transmit underrun is counted by this statistic.

RECEIVE STATISTICS

FramesRcvdOk: Frames of all types that are received without error are counted here.

BytesRcvdOk: The byte counts of frames of all types that are received without error ar totalled here.

MulticastFramesRcvdOk: Multicast frames received without error are counted by this register.

BroadcastFramesRcvdOk: All broadcast frames received by the adapter without error are counted by this register.

AlignmentErrors: Each frame that is received with a bad Cyclic Redundancy Check CRC and is not an integral number of octets in length will be counted by this register. Collision fragments are not counted here unless the fragment is the result of a late collision.

CrcErrors: Frames of at least minimum Ethernet length that are received with a bad CRC but are an integral number of octets in length are counted by this register.

FramesDiscarded: All frames that satisfy the adapter's address filtering criteria but cannot be received due to a lack of receive buffer space cause this counter to increment.

Download DMA Module 58

The download DMA module 58 is responsible for issuing requests for bus master downloads of data from the host system to the adapter memory. This data is then deposited within the adapter's onboard transmit data buffer for either immediate or future transmission.

As soon as buffer descriptors are defined and one of the transmit data buffers becomes available, as described below, the download DMA module submits requests for download bus master operations to the EISA master interface 55. The download DMA module 58 performs byte alignment, including any required packing and unpacking to align the data as implied by the respective starting addresses of the host and the adapter.

The download DMA module 58 also includes logic for maintaining the transmit descriptor ring buffer within the adapter's RAM. The download DMA module 58 generates an interrupt in the appropriate mode to indicate completion of the download operation. Also, the download DMA module 58 informs the transmit DMA module 67 when it is time to begin transmission. Various registers involved in the download DMA operation are described in more detail below as they are involved directly in the data buffering process of the present invention.

Transmit DMA Module 67

The transmit DMA module 67 operates to fetch bytes from the transmit descriptor buffer, the transmit data buffer, or both, as described below, when directed to do so by the download DMA logic 58. The fetched bytes are then presented in sequence to the Ethernet transmitter module 66.

Thus, the transmit DMA module 67 functions to read the contents of the transmit descriptor ring buffer to determine the extent of immediate data, and the length of the overall frame to be transmitted. If a frame specified does not match the specifications for the network, for instance, is shorter than the 802.3 minimum, and the adapter is so enabled, this module will supply additional bytes of undefined data to the Ethernet transmitter module 66 as padding.

Collision retries in the Carrier Sense Multiple Access with Collision Detection CSMA/CD network are handled by the transmit DMA module 67. When a collision is indicated by the Ethernet transmitter 66, the transmit DMA module 67 will resubmit the same frame by reinterpreting the frame descriptor in the buffer.

If enabled, and when the transmit complete condition is satisfied, a transmit complete interrupt is generated for handling by the interrupt controller 60 in the transmit DMA module 67.

The transmit DMA module 67 also stores appropriate frame status in the transmit descriptor ring buffer of the adapter upon completion of transmission.

The transmit DMA module 67 also detects underrun conditions, when a shortfall of data available for transmission occurs.

Again, registers involved in operation of the transmit DMA module 67 are described in detail below.

Ethernet Transmitter Module 66

The Ethernet transmitter module 66 provides media access control function associated with transmission for an 802.3 standard network. This module accepts parallel data bytes from the transmit DMA module 67 and applies the 802.3 access rules, and supplies serial data to the external encoder/decoder chip.

Ethernet Receiver Module 62

Similarly, the Ethernet receiver module 62 is an essential 802.3 implementation. This module accepts serial data from an external encoder/decoder, applies the 802.3 rules to the data and presents the data in parallel form for use by the receive DMA module 63. Thus, the Ethernet transmitter 66 and Ethernet receivers perform the standard CSMA/CD functions.

Receive DMA Module 63

The receive DMA module 63 is a functional complement to the transmit DMA module 67. This module is responsible for accepting parallel data bytes on the Ethernet receiver 62 and depositing them in the adapter's receive ring buffer.

The receive DMA module 63 is responsible for assembling bytes from the Ethernet receiver into 32 bit words prior to storage in the adapter's RAM. At completion of frame reception, the frame's status and length are deposited within the receive ring buffer for use by the host system.

The receive DMA module 63 is also responsible for establishing and maintaining of the receive buffer ring within the RAM of the adapter as described in detail below. Furthermore, the positioning of the "Look Buffer" register allowing the host to view received data, as mentioned below, is handled by the receive DMA module 63.

The receive DMA module 63 also handles interrupt indications under appropriate conditions.

Upload DMA Module 57

The upload DMA module 57 performs data transfers from the receive buffer through the RAM interface 50 to the host system. Thus, the receive ring buffer is managed by the receive DMA module 63 and interpreted by the upload DMA 57. Actual bus master transfers are carried out by the EISA master interface module 55.

The upload DMA module 67 interprets data structures deposited in the receive ring buffer by the receive DMA module 63 including the location and length of a received frame. It also reads the transfer descriptor which is defined by the host system to determine how many bytes of the frame to transfer, and where in the host memory to transfer the frame.

The upload DMA module 57 requests bus master cycles from the EISA master interface module 55 in response to valid transfer requests deposited by the host.

The upload DMA module 57 also utilizes an interlock between the receive DMA module 63 and the upload DMA module 57, to reduce the transfer rate to the host system to prevent "getting ahead" of the frame being received through the receive DMA module 63. Finally, this module generates interrupts indicating completion of a transfer for use by the host.

RAM Interface Module 50

The RAM interface module 50 provides multiplexers and masks for various functions involved in addressing the RAM. The module multiplexes the various address and data sources together to form parameters for RAM access cycles. This module 50 is responsible for gathering up data from the various other modules on the controller that can be read by the host system. Additionally, this module applies a mask to the data to force unused upper bits to a zero, and latches data words for multicycle reads.

The RAM interface module also includes logic allowing partial reads of dynamically changing registers, such as statistics registers. This logic is described in detail below.

JTAG Module

Also included in the controller, though not shown, is a JOINT TEST ACTIPN Group JTAG module which implements a state machine as specified in The Institute for Electrical and Electronic Engineers IEEE standard 1149.1–1990, May 21, 1990. This module provides a scan test of the ASICs pins for use during manufacture.

Partial Read Mechanism

Figure 4:
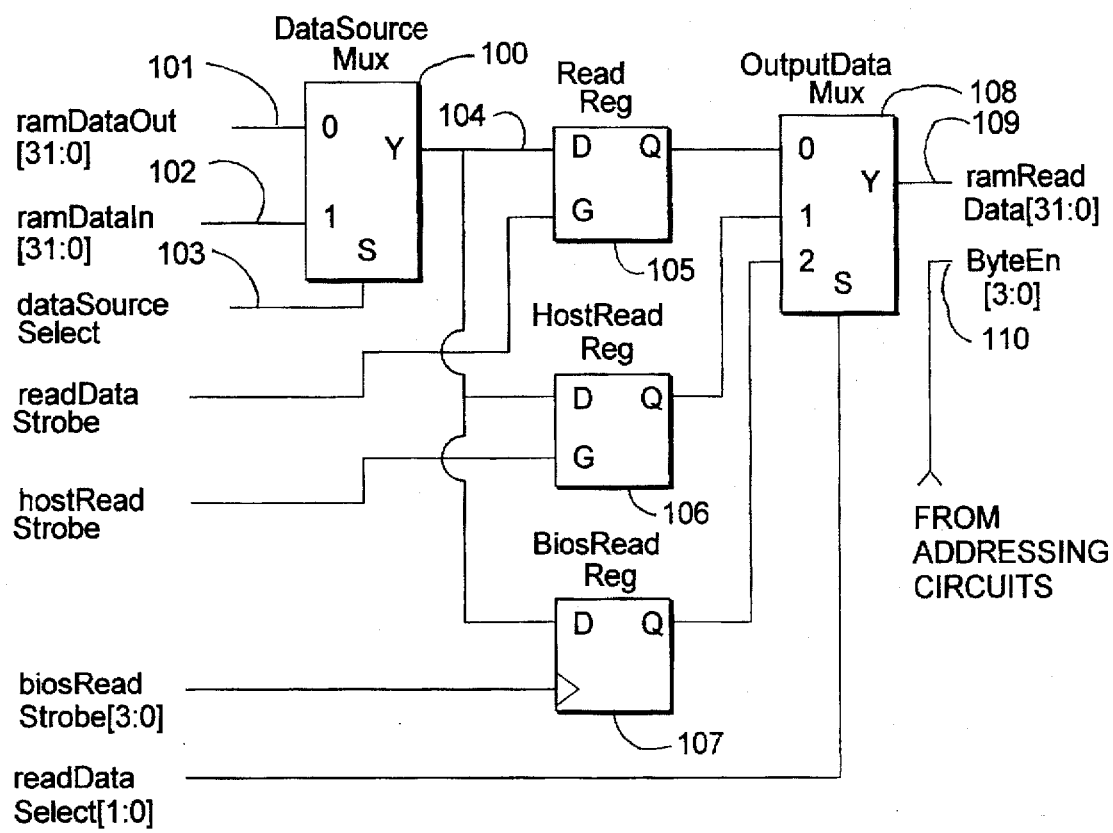
FIG. 4 is a block diagram of the read data path in the RAM interface 50 of FIG. 3.

As mentioned above, the RAM interface 50, shown in FIG. 3, includes the mechanism for allowing partial reads of dynamically changing data, FIG. 4 shows the data path within the RAM interface block 50 for accomplishing this function. The data path includes a data source multiplexer 100 connected to an output data bus 101 from the RAM and an input data bus 102 to the RAM. A data source select signal is supplied on line 103.

The data source multiplexer 100 is used to select between the data from the RAM on bus 101 and data read from ASIC registers on bus 102. The data source select signal on line 103 is controlled by a decode of an address, Which indicates an ASIC register access in combination with a host slave acknowledge signal for driving the EISA bus.

The output of the data source multiplexer 100 is supplied on line 104 to a plurality of read registers. The first read register 105 is used for autonomous reads within the adapter. The second register 106 is used for host reads. The third register 107 is used for host reads of the BIOS ROM in the system of FIG. 2.

The outputs of the autonomous read register 105, the host read register 106, and the BIOS read register 107 are supplied as inputs to an output data multiplexer 108. The output data multiplexer 108 supplies RAM read data on line 109 for presentation to the host system bus. Addressing circuits on the chip also generate byte enable signals on line 110 for presentation with the RAM read data on line 109. The byte enable signals 110 represent a decode of the two low order bits (orders 0 and 1) of a byte address, where an address for the double word storage location consists of the bits of order 2 and above. The byte enable signals may be presented in a decoded or undecoded fashion as meets the needs of a particular host interface. The EISA bus uses four byte enable signals in the decoded fashion, each for an eight-bit byte, for a total 32-bit (double word) data path.

The autonomous read register 105 is clocked by a read data strobe, which is generated every time a read access is made to a storage location on the ASIC or the RAM.

Figure 5:
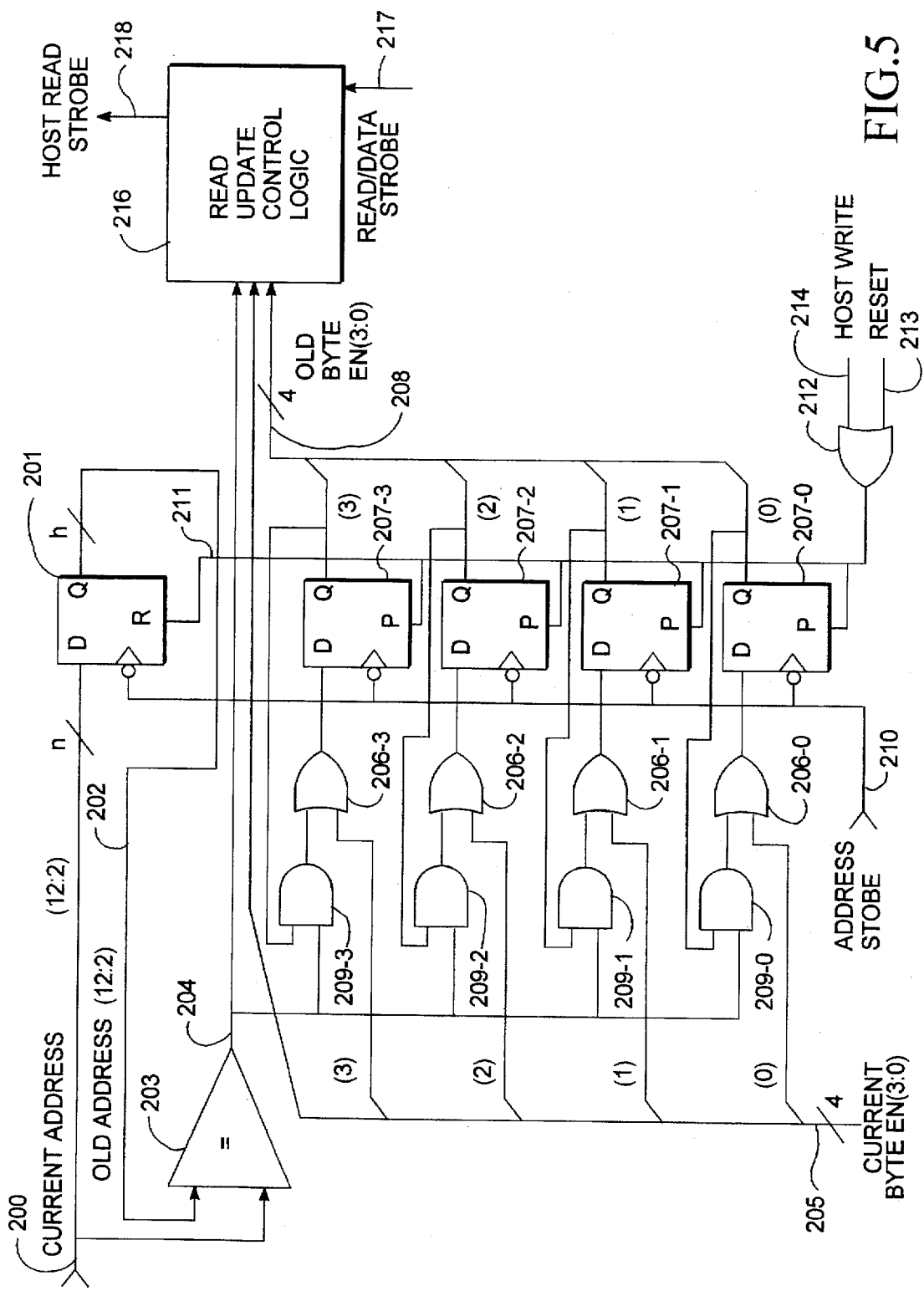
FIG. 5 is a schematic block diagram of logic for applying the host read strobe to the read store according to a preferred implementation of the present invention.

The host read strobe is generated by logic shown in FIG. 5, and prevents updates of the host read register during sequential reads to different bytes of the same storage location.

The host read register 106 will not update its contents during host reads from the same double word location if previously unread bytes within the double word are being accessed. Otherwise, the contents of the host read register are updated during the read operation.

The BIOS read register 107 is clocked one byte at a time by the BIOS read strobe (3:0), which is generated by RAM cycle control logic in the ASIC. This separate function is required to handle interleaved code and data accesses.

The output data multiplexer 108 selects the contents of one of the three data registers 105, 106, 107 for routing to the host together with the byte enable signals. The autonomous read register 105 is selected when an autonomous read cycle internal to the ASIC is taking place. This input is the default selection and is active when both of the other selection criteria are false. The host read register 106 is selected during host slave accesses for reads of the RAM or ASIC resident registers. The BIOS read register 107 is selected during host slave accesses to the BIOS ROM.

Logic for controlling the host read strobe is shown in FIG. 5. This logic includes address input 200 which carries the address (current address 12:2) of the storage location currently being accessed by the host. Input 200 is coupled to the input of register 201 for storing the current address so that it may be compared with an address used during the next read operation by the host. The output (old address 12:2) of the register 201 is supplied across line 202 as a first input to comparator 203. The current address input 200 is also supplied as an input to the comparator 203. The output of the comparator 203 on line 204 is asserted true when the current address on line 200 and the old address on line 202 match. This indicates a sequential read of at least two accesses by the host to the same double word storage location.

The logic also includes a current byte enable (3:0) input 205. The four byte enable signals from input 205 are supplied as inputs to respective OR gates 206-3, 206-2, 206-1, and 206-0. The outputs of the respective OR gates 206-3 through 206-0 are supplied to respective latches 207-3 through 207-0. The output of the latches 207-3 through 207-0 are supplied on line 208 as the old byte enables (3:0). The four old byte enables are fed back to respective AND gates 209-3 through 209-0. The second input of the AND gates is the signal on line 204 from comparator 203 indicating a sequential read. The output of the AND gates 209-3 through 209-0 is supplied as the second input to the respective OR gates 206-3 through 206-0.

All of the registers 201, 207-3, 207-2, 207-1, and 207-0 are clocked on the falling edge of the address strobe signal on line 210. The address strobe signal is asserted in response to the read data strobe during every host read that does not access a ROM in the adapter shown in FIG. 2.

Thus, the current address on line 200 is stored in the address register 201 and the old byte enable signals 208 are updated on the falling edge of the address strobe at the end of the address cycle.

The address register 201 is reset to all zeroes upon assertion of the signal on line 211. The signal on line 211 is generated at the output of OR gate 212. The inputs to OR gate 212 include the system reset signal on line 213 and the host write signal on line 214. Thus, the address register is reset to all zeroes upon system reset, or when the host writes data.

The same signal on line 211 is supplied to preset inputs to the registers 207-3 through 207-0, so that these registers are all preset to 1 upon assertion of the signal.

The byte enable signals are processed in a much more complicated fashion than the address. In particular, once an old byte enable register (207-3 through 207-0) has been set to one by a high on one of the current byte enable lines 205, then that particular register will be forced to remain at one when the host sequentially reads the same address a second time. Thus, the output of the AND gate 209 will be a 1 during a sequential read if the byte enable signal stored in the respective register 207 is already high. If the old byte enable is low, the output of AND gate 209 will be zero during the sequential read and the contents of the byte enable register are controlled by the current byte enable on line 205. The byte enable registers 207-3, through 207-0 will accumulate the byte enable signals of sequential reads to the same address location for supply on line 208.

Thus, if the host reads the same double word location four times in a row, one byte at a time, starting with byte 3, after the first read, register 207-3 will store a high value. After the second read, both registers 207-3 and 207-2 will store a high value. After the third read, all three registers 207-3, 207-2, and 207-1 will store a high value. Finally, after the fourth read, all four registers 207-3 through 207-0 will store high values.

If the host writes data to the adapter between sequential reads, then all of the registers are preset to one. If the host does not sequentially read all of the registers, then during the first read to a different address, the values in all four registers are allowed to go to the value of the current byte enable.

The read update control logic 216 receives as inputs, the signal on line 204 from comparator 203, the current byte enables on line 205, and the old byte enables on line 208. Also, the read update control logic 216 receives the read data strobe on line 217 which is asserted during every read access to the adapter registers or RAM by the host.

The read update control logic 216 controls application of the host read strobe on line 218 (which corresponds to the host read strobe shown in FIG. 4) for controlling the host read register 106. Basically, it enables the supplying of a read data strobe as the host read strobe in certain conditions when it is desirable to update the host read register. Otherwise, it disables the assertion of the read data strobe 217 as the host read strobe on line 218.

Figure 6:
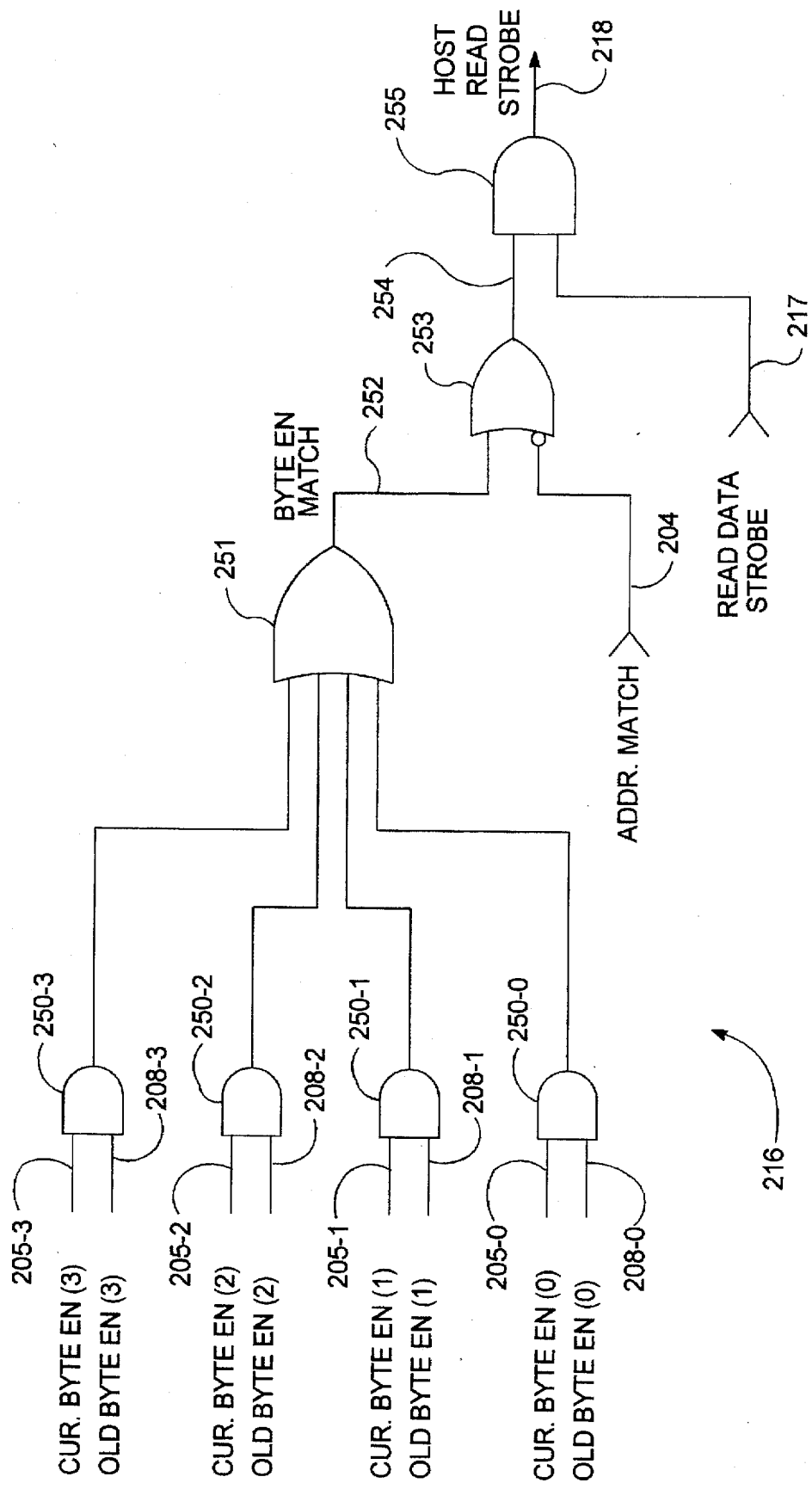
FIG. 6 is a schematic block diagram of the read update control logic of FIG. 5.

FIG. 6 provides a logic diagram for the read update control logic 216 of FIG. 5. This implementation of the logic includes AND gates 250-3 through 250-0 which receive as inputs a current byte enable and an old byte enable for respective channels from lines 205 and 208. Thus, gate 250-3, receives inputs on lines 205-3 and 208-3 of the current byte enable for channel 3 and the old byte enable for channel 3.

The output of the AND gates 250-3 through 250-0 are supplied as inputs to OR gate 251. The output of the OR gate 251 is a byte enable match signal on line 252, indicating that at least one of the byte enable channels included matching current byte enable and old byte enable.

The byte enable match signal on line 252 is supplied as a first input to OR gate 253. The second input to OR gate 253 is an active low input receiving the address match signal on line 204 generated by the comparator 203 shown in FIG. 5.

The output of the OR gate 253 is a sample enable signal on line 254. The sample enable signal is supplied as a first input to AND gate 255. The second input to the AND gate 255 is the read data strobe signal on line 217. The output of the AND gate 255 is the host read strobe signal on line 218.

Thus, the host read strobe 218 is applied to update the host read register if the current address is not equal to the old address as indicated on line 204, or if the old address is equal to the current address, as indicated on line 204, and the current byte enable on line 205 does not identify any bytes which have been previously accessed during the sequence of sequential reads, as indicated by the old byte enable on line 208.

Figure 7:
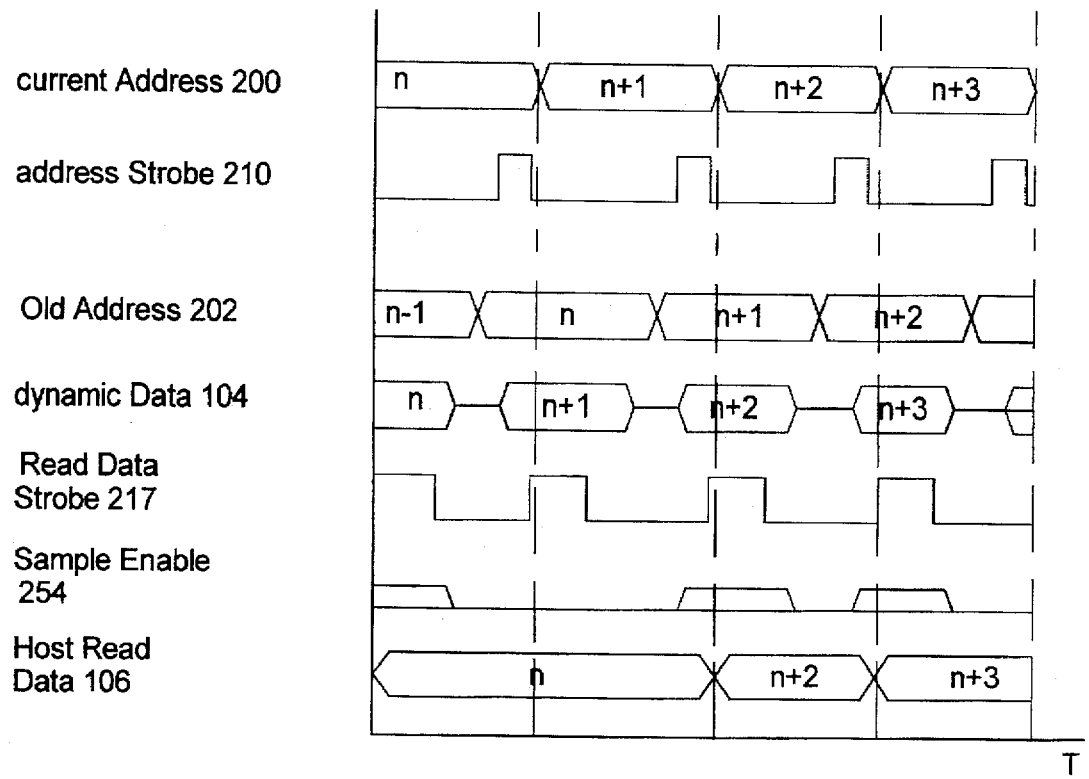
FIG. 7 is a timing diagram illustrating four address cycles n, n+1, n+2, and n+3 according to a preferred implementation of the present invention.
Figure 8:
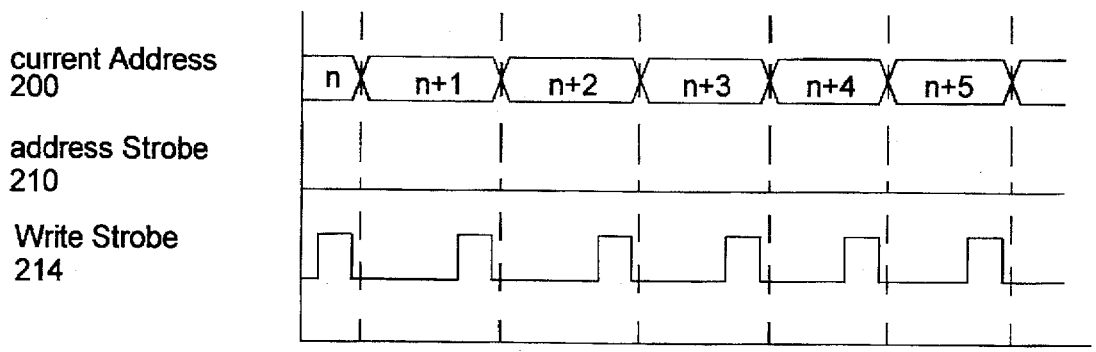
FIG. 8 is a timing diagram illustrating the relation between the write strobe and the address strobe during a write sequence as address cycles are applied according to a preferred implementation of the present invention.

The operation of the implementation of FIGS. 4–6 can be further understood with reference to the timing diagrams of FIGS. 7 and 8. FIG. 7 illustrates the timing for four address cycles n, n+1, n+2, and n+3 on the current address line 200. During the interval for current address n, the old address on line 202 supplies the address n−1. The data on line 104 is data corresponding to the address n. The read data strobe on line 217 is asserted during the middle of the dynamic data window for the address n, provided the sample enable signal on line 254 is asserted. If the sample enable signal on line 254 is not asserted, then the host read strobe on line 218 will not be asserted.

Toward the end of the address cycle, the address strobe 210 is asserted. This causes the old address to change so that it stores the address n. Similarly, all of the old byte enable signal registers are updated.

During the assertion of address n+1 on line 200, if the sample enable signal is not asserted, such as when the address n+1 is equal to the address n and no byte enable match occurs, then the host read data 106 will not change, and will maintain the data accessed using address n. During the next cycle for address n+2, the old address 202 will be updated to n+1, dynamic data on line 104 will be changed to the data at address n+2, and if the host read strobe 218 is asserted, the host read data in register 106 will be updated to the data at address n+2.

The write sequence is illustrated in FIG. 8. As can be seen, during the write sequence, the address strobe signal on line 210 is not asserted, but a write strobe on line 214 is asserted. This causes the old address register 201, and all of the old byte enable registers 207-3 through 207-0 to be cleared, by setting the old address to zero, and all of the old byte enables to 1. This prevents erroneous assertion of the host read strobe on line 218, in the logic illustrated, in the event of a write strobe between intervening reads of the same address.

The logic of the preferred embodiment described above prevents update of the host read data register 106 if any byte of a current read has already been read previously in the sequence. One alternative would involve altering the logic to prevent update if any byte of a current read has not yet been read in the sequence. Persons of skill in the art may apply yet other modifications within the scope of the present invention.

As can be seen, the present invention presents an effective mechanism for allowing partial reads of dynamically changing data, while preserving the accuracy of the data as of the time of the first read. This enables byte-wise, word-wise, or double word-wise sampling of a dynamically changing double word statistics register in the adapter of the preferred embodiment.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A network interface system suitable for connecting a host data processing system to a network and for providing the host with a changing network statistic in response to a host read statistic instruction comprising:

a memory including a host addressable storage location for said changing network statistic, said statistic stored as a first section and a second section;

a network interface processor, having a write connection coupled with said memory, a host connection, a network connection, and a partial read connection, the network interface processor further comprising;

means for generating and writing said changing network statistic to said storage location independent of the host data processing system: said means for generating and writing said charting network statistic including
   a statistical module monitoring said network connection and supplying the changing network statistic to said write connection, whereby said changing network statistic is stored in said storage location as said first and said second sections;

a partial read store, coupled to said memory and to said partial read connection to upload said changing network statistic from the addressed storage location and to supply at least one of said sections of said statistic from said partial read store to said host connection;

a control unit, coupled to said partial read store to receive host instructions, and comprising;

means for detecting successive partial host read statistic instructions, each statistic instruction addressed to one of said sections of said storage location, said means for detecting successive partial host read statistic instructions including an address store having as input a current host instruction address and having as output a prior host instruction address when said prior host instruction is a partial read statistic instruction and having as output zero when said prior host instruction is a write:

an address comparator having as inputs said current host instruction address and said address store output and having an enabled output condition when the output of said address store and said current host instruction address match indicating a successive read of at least two accesses by the host to said storage location and a disabled output condition when there is no match and means to direct said partial read store to supply to said host connection without uploading from said memory when said sequential instructions are directed to different ones of said sections, and to direct said partial read store to upload from said memory and to supply to said host connection when said successive partial host read statistic instructions are directed to same ones of said sections, said means to direct said partial read store includes an update signal controlling the uploading of said partial read store and which is in the enabled condition to cause said uploading when the output condition of said address comparator is disabled and which is in the disabled condition when the output condition of said address comparator is enabled.

2. The network interface system of claim 1, wherein further said means for detecting causes said partial read store to upload from said memory and to supply to said host connection when a host read statistic instruction is preceded by a host write instruction directed to said addressable storage location.

3. The network interface system of claim 1, wherein said means for detecting successive partial host read statistic instructions, further comprises;

a section address store each indicating an enabled output condition in response to a prior host read statistic instruction for respectively said first and said second section of said storage location and in addition having said enabled output condition in response to a host write instruction;

a section enable comparator having as inputs the output conditions of said section address stores and a current byte enable signal indicating to which section the current host instruction is addressed to, and having an enabled output condition when a section addressed by a current host instruction is matched by an enabled output on the corresponding section address store, indicating a successive read of at least two accesses by the host to said storage location, and a disabled output condition when there is no match; and wherein said update signal of said means to direct said partial read store is also in the enabled condition, to cause said uploading, when the output condition of said section enable comparator is enabled, thereby indicating successive host read statistic instructions for the same section, and which is in the disabled condition when the output condition of said section enable comparator is disabled.

* * * * *